Dec. 20. 1927.  
A. I. MARCUM  
VEHICLE AXLE  
Filed June 12, 1924  
1,653,114  
2 Sheets-Sheet 1

INVENTOR.  
ARTHUR I. MARCUM.  
HIS ATTORNEYS

Dec. 20, 1927. 1,653,114
A. I. MARCUM
VEHICLE AXLE
Filed June 12, 1924 2 Sheets-Sheet 2

INVENTOR
ARTHUR I. MARCUM.
HIS ATTORNEYS.

Patented Dec. 20, 1927.

1,653,114

UNITED STATES PATENT OFFICE.

ARTHUR I. MARCUM, OF OAKLAND, CALIFORNIA, ASSIGNOR TO EMORY WINSHIP, OF SAN FRANCISCO, CALIFORNIA.

VEHICLE AXLE.

Application filed June 12, 1924. Serial No. 719,491.

The invention relates to vehicle axles and particularly to the front axles of road vehicles which are provided with dirigible wheels.

An object of the invention is to provide a front axle for a vehicle which is of such construction that a standard axle may be used in vehicles having different spring spreads.

Another object of the invention is to provide a front axle in which the spring pad is integral with the spindle supporting fork.

Another object of the invention is to provide a front axle having an elongated spring pad extending in the direction of the length of the axle, so that the position of the spring with relation to the end of the axle or with relation to the axis of the wheel carrying spindle, may be varied.

The invention possesses other advantageous features, some of which with the foregoing will be set forth at length in the following description, where I shall outline in full that form of my invention which I have selected for illustration in the drawings accompanying and forming part of the present specification. In said drawings I have shown one form of axle embodying my invention, but it is to be understood that I do not limit myself to such form, since the invention, as set forth in the claims, may be embodied in a plurality of forms.

Referring to said drawings.

Front axles for motor vehicles such as automobiles and motor trucks, are usually formed of a standard length between the axes of the two wheel carrying spindles at opposite ends of the axle. The spring spread, or the distance between the two springs arranged at the opposite ends of the axle, vary in different vehicles, so that it is necessary to construct a special axle for each make of vehicle. In accordance with my invention, I provide an axle on which the spring may be secured at variable positions, so that a standard axle may be used in vehicles having different spring spreads. This I accomplish by providing an elongated spring pad extending in the direction of the length of the axle and the spring may be secured to the pad at any desirable point, so that the distance between the springs may be varied within the limit determined by the length of the spring pad. By this arrangement it is possible to employ a standard tread axle in a plurality of vehicles having different spring spreads, thereby permitting a manufacturer to standardize on one form of axle and thereby greatly reducing the number of axles which must be carried in stock.

Figure 1:
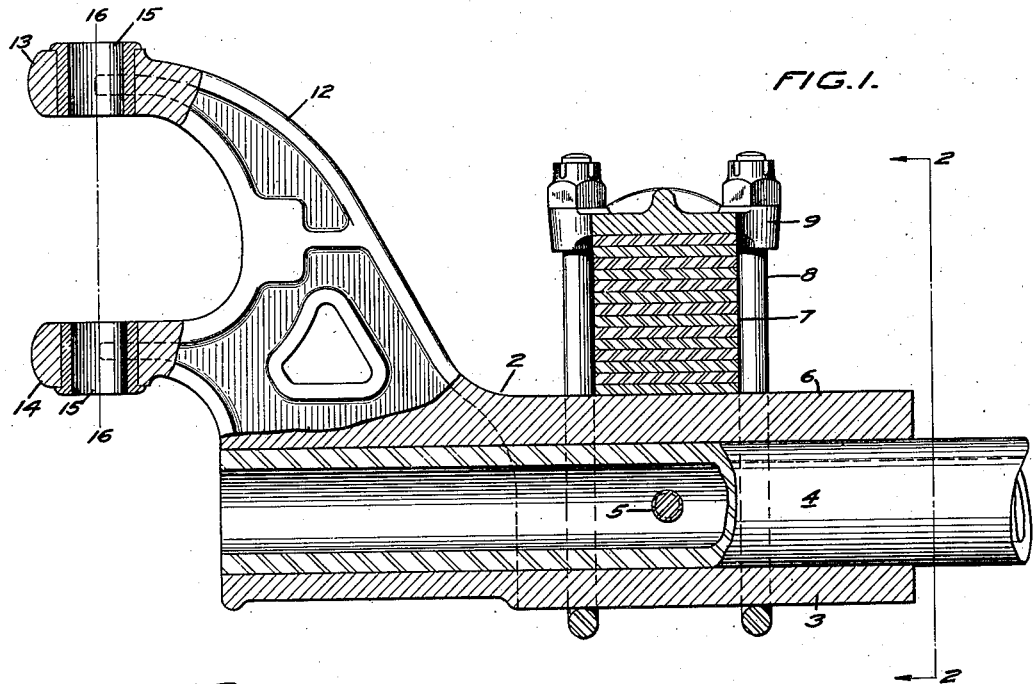
Figure 1 is a side elevation of one end of a front axle embodying my invention, a portion of the structure being shown in section to disclose the construction.
Figure 2:
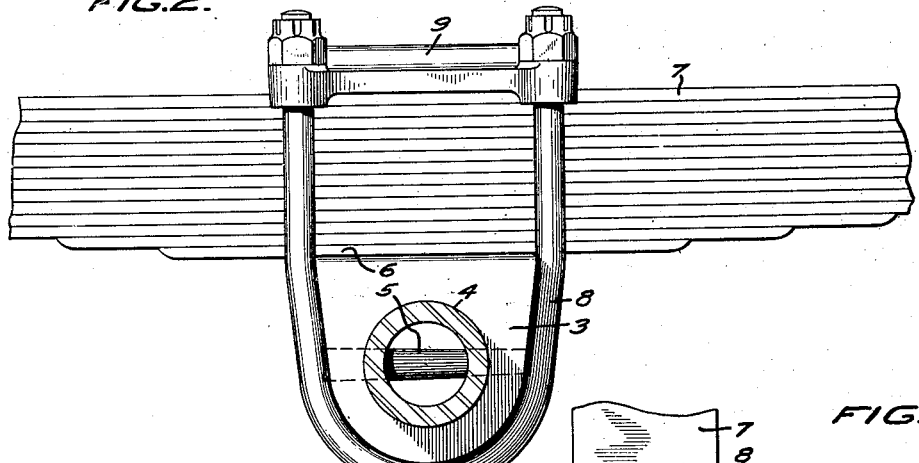
Figure 2 is a cross section of the axle taken on the line 2—2 Figure 1.
Figure 3:
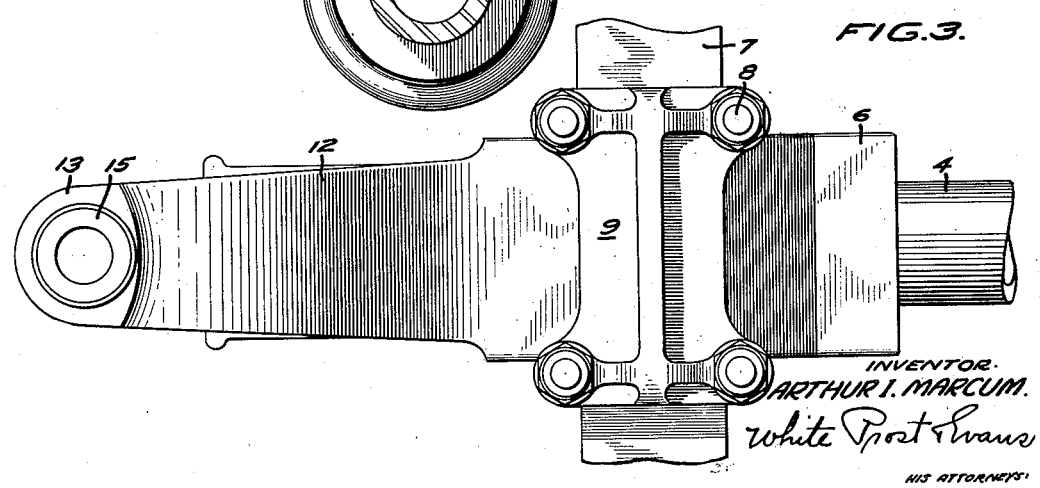
Figure 3 is a top or plan view of the end of the axle shown in Figure 1.

The axle of my invention, one end of which is shown in Figure 1, comprises a bracket 2 usually formed of steel, having a body portion 3 which is provided with a socket to receive the end of the axle 4, which is preferably tubular. The axle is pressed tightly into the socket and is secured to the body portion by a pin 5 extending through the axis and the body portion. The body portion is provided on its upper surface with a flat, elongated spring pad 6, which extends in the direction of the length of the axle 4. The pad is of greater length than the width of the leaf spring 7, so that the spring may be positioned in any desirable position on the spring pad in accordance with the spread of the springs in the vehicle in which the axle is to be used. The under portion of the body 3 of the bracket shown in Figure 2 is preferably semi-cylindrical in form and the spring in this construction is secured to the body portion by U-bolts 8 passing around the body portion and extending through the clamping plate 9 which overlies the spring. The spring pad 6 is smooth and the under portion of the body is smooth, so that the spring and the bolts 8 may be arranged in any desired position on the spring pad. At its end, the bracket 2 is provided with a spindle supporting fork 12, the arms 13 and 14 of the fork being provided with bushings 15 to receive the spindle. The axis of the spindle is indicated by the line 16. The two arms of the fork are preferably disposed above the plane of the axle 4, to reduce the height of the vehicle frame, but this arrangement is not essential. The fork 12 and the spring pad 6 are preferably integral so that a portion of the weight of the vehicle is sustained by the bracket 2. Due to this arrangement the axle 4 may be made lighter, due to the fact that the bracket carries a portion of the load and therefore the axle 4 is preferably made tubular. By forming the fork and the spring pad integral, axles of various treads may be readily produced by merely employing axle tubes of different lengths, so that a manufacturer may readily assemble the brackets and the tube to produce an axle of any required tread.

Figure 4:
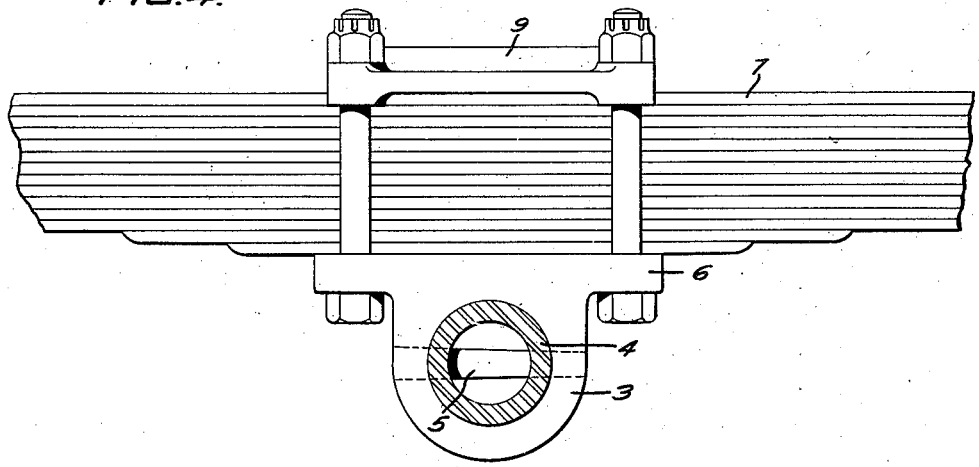
Figure 4 is a cross section through an axle showing a modified form of means for securing the spring to the axle.
Figure 5:
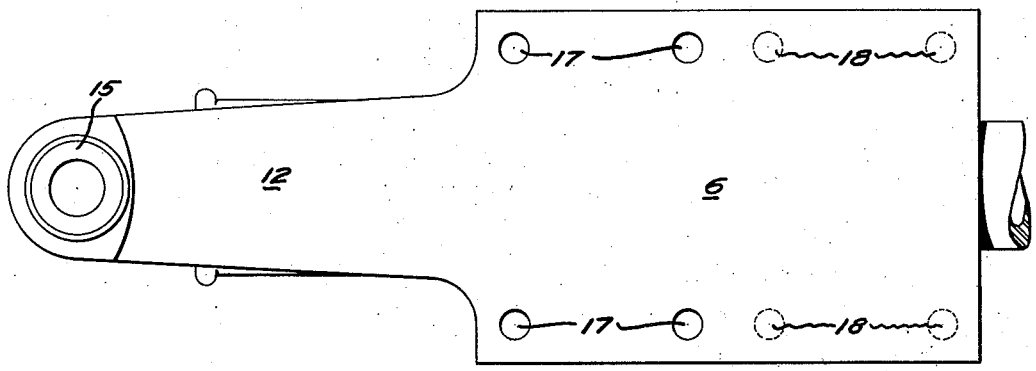
Figure 5 is a top or plan view of the modified form of spring pad shown in Figure 4 showing the range of adjustment in position of the spring.

Instead of clamping the spring to the axle by U-bolts which encircle the axle, I prefer to employ bolts which pass through holes in the spring pad, as shown in Figs. 4 and 5. The holes 17 in the spring pad 6 may be drilled at any desired location depending on the spring spread and due to the length of the pad the range of spring spread may vary over a considerable distance with a standard axle constructed in accordance with this invention. The holes 17 may be positioned as shown in Fig. 5, or may be formed in any other position as indicated by the dotted holes 18, in accordance with the spring spread of the vehicle.

I claim:

1. A front axle for a vehicle including a central section of commercial form and two end brackets rigidly secured to said section, each of said brackets being provided with means to support the spindle of a wheel, and being elongated and formed so as to provide an extended surface of uniform contour so that a spring may be supported at any point along said elongated portion.

2. A front axle as defined in claim 1 in which the central section is tubular in form.

3. A bracket for securing a wheel and an adjacent spring assembly to an axle section of commercial form consisting of a casting having means to attach it to the spindle of the wheel and provided with a socket to secure the axle section thereto, and an elongated portion of uniform contour throughout its length and so formed that the spring may be secured at any point along said portion.

4. A front axle for a vehicle comprising a bracket having a socket therein adapted to receive the axle, a spindle-supporting fork on the end of the bracket, an elongated spring pad integral with the bracket and extending in the direction of the length of the axle, a leaf spring of lesser width than the length of the pad whereby the distance between the spring and the spindle axis may be varied and means for securing the spring to the bracket.

5. A front axle for a vehicle comprising a spindle supporting fork having a socketed body portion, an axle fitted into said socketed portion, an elongated spring pad formed on said body portion, the spring pad extending in the direction of the length of the axle, a spring and means for securing the spring to the axle, the length of the pad permitting the spring to be secured thereto at various points, whereby the distance between the spring and the spindle axis may be varied.

In testimony whereof, I have hereunto set my hand.

ARTHUR I. MARCUM.